United States Patent [19]
Yamashita

[11] 3,964,822
[45] June 22, 1976

[54] PROJECTION SCREEN AND PROCESS FOR PRODUCTION THEREOF

[75] Inventor: Akira Yamashita, Iwakuni, Japan

[73] Assignee: Mitsui Petrochemical Industries, Ltd., Tokyo, Japan

[22] Filed: Oct. 7, 1974

[21] Appl. No.: 512,994

[30] Foreign Application Priority Data
Oct. 12, 1973  Japan.............................. 48-113872
Oct. 19, 1973  Japan.............................. 48-116863

[52] U.S. Cl. ............................ 350/117; 350/129
[51] Int. Cl.² ................. G03B 21/56; G03B 21/60
[58] Field of Search ............................ 350/117, 129

[56] References Cited
UNITED STATES PATENTS

| | | |
|---|---|---|
| 3,507,548 | 4/1970 | Hoffmann et al. ................... 350/117 |
| 3,573,074 | 3/1971 | Duke et al. ...................... 350/117 X |
| 3,653,740 | 4/1972 | Ogura et al. ......................... 350/117 |
| 3,811,750 | 5/1974 | Coulthard ........................... 350/117 |
| 3,844,644 | 10/1974 | Martinez .......................... 350/129 X |
| 3,851,950 | 12/1974 | Andres et al. .................. 350/129 X |

Primary Examiner—Richard A. Wintercorn
Attorney, Agent, or Firm—Cooper, Dunham, Clark, Griffin & Moran

[57] ABSTRACT

A projection screen includes a substrate having a metallic aluminum surface and a transparent film overlay. The metallic aluminum surface is provided with a pattern of directional irregularities and a pattern of craters. The projection screen is produced by subjecting an aluminum surface to a mechanical surface treatment to form a dense pattern of fine irregularities, etching the treated surface to form a crater pattern thereon and coating the resulting surface with a protective transparent film.

6 Claims, 5 Drawing Figures

● ● HORIZONTAL DISTRIBUTION
× × VERTICAL DISTRIBUTION

100μ

100μ

100μ

PROJECTION SCREEN AND PROCESS FOR PRODUCTION THEREOF

BACKGROUND OF THE INVENTION

The present invention relates to projection screens and more particularly to a projection screen having a treated metallic aluminum substrate, as well as to a process for the production thereof.

A known type of projection screen using metallic aluminum comprises an aluminum foil layer having a pattern of directional irregularities and a plastic coating overlying the pattern; another known projection screen comprises an aluminum foil layer adhered to a glass fiber reinforced polyester backing shaped in a form of spherical surface. These known types of screens can be used for projection under daylight conditions, but suffer from disadvantages such as strong gleam in a direction normal to the screen surface which results in eye fatigue and difficult viewing. In addition, these known types of aluminum screens are subjected to the formation of wrinkles and a wavy surface upon final processing, as well as deformation and low rigidity.

When an aluminum surface is subjected to etching, or to sandblasting to form a pattern of non-directional irregularities and then anodized for use as a projection screen, the surface irregularities of the resulting screen have poor directional properties and (with particular reference to the sandblasted pattern) exhibit a non-uniformity of distribution, in a microscopic sense, which is not suitable for a projection screen necessitating high luminance.

SUMMARY OF THE INVENTION

According to one aspect of the present invention, there is provided a projection screen comprising a substrate having a metallic aluminum surface, a transparent film overlying the metallic aluminum surface, the metallic aluminum surface having a pattern of directional irregularities and a pattern of craters provided thereon, and the transparent film having a thickness ranging from 0.5 to 10 microns and a roughness having a maximum height (R max) ranging from 0.2S to 25S.

According to another aspect of the present invention, there is provided a process for producing a projection screen comprising a substrate having a metallic aluminum surface and a transparent film overlying the metallic aluminum surface which comprises the steps of applying a mechanical surface treatment to a metallic aluminum surface of a substrate to form a pattern of directional irregularities, etching the pattern thus obtained to form a crater pattern thereon, and forming a transparent film over the resulting patterns.

An object of the present invention is to provide a projection screen free from the drawbacks of conventional metallic aluminum projection screens.

Another object of the present invention is to provide a projection screen free from gleam.

A further object of the present invention is to provide a projection screen which is easy to view and does not cause eye fatigue.

Still another object of the present invention is to provide a projection screen of high luminance which is visible even under normal room light or actual daylight conditions.

Still a further object of the present invention is to provide a process for producing a projection screen free from the drawbacks of conventional metallic aluminum projection screens.

DETAILED DESCRIPTION

Figure 1:
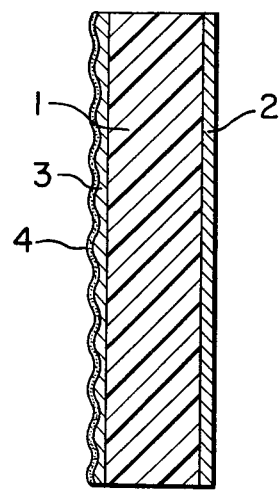
FIG. 1 is a partial cross-sectional view of a projection screen according to the present invention.

The described projection screen comprises a substrate having a metallic surface and a transparent film overlay.

The substrate may be any substrate having a metallic aluminum surface layer. Representative substrates having a metallic aluminum surface are a metallic aluminum plate, a metallic aluminum foil, preferably of thickness greater than 80 microns, and a laminate composed of a plastic plate and a metallic aluminum foil overlay on one or both sides of the plastic plate.

The metallic aluminum surface of the substrate has a fine, dense pattern of directional irregularities and a pattern of craters provided, at random, on the pattern of directional irregularities.

The pattern of directional irregularities is a directional cubic pattern which may be formed, for example, by applying a conventional mechanical surface treatment such as applying a grinding cloth of paper, a brush, a roller or the like. The pattern of directional irregularities is different from a non-directional pattern as formed by sandblast.

The pattern of craters is a general term used herein to describe a pattern of many and complex irregularities having various sizes. The pattern of craters may be produced, for example, by alkali etching or acidic etching causing dissolution of metallic aluminum. In general, the etching for forming the pattern of craters is conducted preferably after the completion of the mechanical surface treatment for producing directional irregularities.

On the metallic aluminum surface having the fine and dense pattern of directional irregularities and the pattern of craters produced on the pattern of directional irregularities, there is provided a transparent film of 0.5 to 10 microns thickness and having a roughness of a maximum height (R max) ranging from 0.2S to 25S, preferably from 1.5S to 5S according to JIS B 0601.

The transparent film may be an aluminum oxide film, a film of plastic formed by plastic coating, or a coating film of a paint or the like. The transparent film has a pattern corresponding to that on the metallic aluminum surface.

When the thickness of the transparent film is less than 0.5 microns, the surface of the metallic aluminum is not sufficiently protected and there occurs interference of light on the surface of the film to form a so-called rainbow.

When the thickness is greater than 10 microns, efficiency of reflection of light is lowered because of turbidity due to impurities.

When the surface roughness is less than 0.2S, the scattering range of light is narrow. When the surface roughness exceeds 25S, the scattering range of light is too wide and thereby a light reflecting once on the film surface reflects again on another portion of the film surface resulting in low reflection efficiency. In addition, it is difficult to form uniformly such a thick film.

According to the process for producing the projection screen of the present invention, a mechanical surface treatment is first applied to the metallic aluminum surface of the substrate. Representative mechanical surface treatment may be conducted by using a conventional grinding cloth or paper, a brush or rolling to form a pattern of directional irregularities. For example, an endless grinding belt (No. 80–No. 500) may be mounted on a wide belt sander and rotated in contact with the aluminum surface at a circumferential speed of about 20m./sec. The resulting surface state depends on the circumferential speed and roughness of the belt. It is preferable to produce a surface roughness of 0.2S–25S as a maximum height (R max) as defined in JIS B 0601.

As the second step, etching is applied to the metallic aluminum surface thus subjected to the mechanical treatment. The etching may be effected by conventional alkali etching or acidic etching. In other words, alkali etching may be conducted by treating the aluminum surface of the substrate subjected to the mechanical surface treatment with an aqueous solution of alkali such as, for example, sodium hydroxide. Acidic etching may also be effected by treating the aluminum surface with an acid such as, for example, nitric acid, hydrochloric acid, or hydrofluoric acid.

For example, when a 2N. aqueous solution of sodium hydroxide is used at 30°C, the aluminum surface is, in general, soaked in the aqueous solution for 3–15 min. When 1N. hydrofluoric acid is used at 30°C, the aluminum surface is usually soaked in the hydrofluoric acid for 5–25 min. The etching temperature is preferably lower than 80°C so as to prevent vaporization of water. The concentration of the etching solution is preferably dilute because a high concentration of etching solution results in corrosion of the vessel. When the etching time is too short, the crater pattern is not sufficiently formed. On the contrary, when the etching time is too long, the previously formed directional irregularities disappear. The surface state of the aluminum surface varies depending upon etching temperature, concentration of the etching solution and etching time. It is preferable to effect the etching treatment in such a way that the resulting surface roughness is 0.1S–1.5S as a maximum height (R max) according to JIS B 0601.

The third step of the process is the formation of a transparent film on the aluminum surface thus treated. The transparent film may be an aluminum oxide film, a film of plastic such as a synthetic resin or a coating film of a paint. The aluminum oxide film may be produced by conventional anodization. The treated aluminum surface having the directional irregularities and crater pattern is subjected to electrolysis by placing the aluminum surface in an electrolysis bath such as sulfuric acid bath, sulfosalicylic acid bath, phosphoric acid bath or the like. For example, when a 2N. sulfuric acid bath is employed as an electrolysis bath, it is usual to electrolyze at $1A/dm^2$–$5A/dm^2$ for 2–30 min. The anodization treatment produces an oxide film on the metallic aluminum surface to protect the surface. When the oxide film is too thick, the post-processing becomes difficult so that the thickness is preferably 0.5–10 microns.

It is preferable to soak the aluminum surface thus anodized in flowing water for washing and further it is preferable to apply a conventional treatment for sealing holes so as to eliminate fine holes and render the finished surface smooth.

When a plastic film such as synthetic resin film is used as the transparent film, the film may be coated on the metallic aluminum surface according to conventional methods for producing a plastic film on a substrate, for example, applying a solution of plastic in a volatile solvent followed by vaporization the solvent, or applying molten plastics.

The projection screen of the present invention has high efficiency of reflection and high effective luminance so that projection under normal room light or actual daylight conditions is possible. The projection screen is easy to view, does not cause eye fatigue, and does not retain dirt. Furthermore, the screen is so hard that it is resistant to surface damage.

Referring to FIG. 1, there is illustrated a partial cross-section of a projection screen composed of a high density polyethylene plate 1 of 1.8mm. in thickness, a metallic aluminum foil 2 of 100 microns in thickness which is not subjected to a surface treatment, a metallic aluminum foil 3 of 100 microns in thickness which has been subjected to the surface treatment according to the process of the present invention, and an aluminum oxide film 4 of 0.5 microns in thickness.

Figure 2:
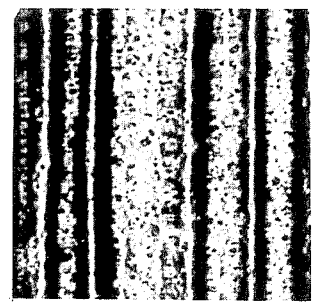
FIG. 2 is a photomicrograph of the light-reflecting surface of a projection screen as shown in FIG. 1.

Referring to FIG. 2, there is shown a photomicrograph of the light-reflecting surface of the projection screen as illustrated in FIG. 1. In FIG. 2 there are clearly observed directional irregularities formed at a fine and dense interval and a crater pattern on the directional irregularities. The surface roughness corresponds to a maximum height (R max) of 3S.

Figure 3:
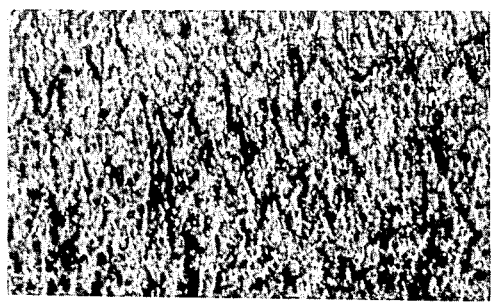
FIG. 3 is a photomicrograph of the light-reflecting surface of a projection screen of a prior art.
Figure 5:
FIG. 5 is a photomicrograph of an aluminum surface subjected to the mechanical surface treatment according to the present invention.

Referring to FIG. 3, the photomicrograph shows the light-reflecting surface of a commercially available prior art projection screen having a pattern of random irregularities. The surface roughness corresponds to a maximum height (R max) of 1.5S.

Figure 4:
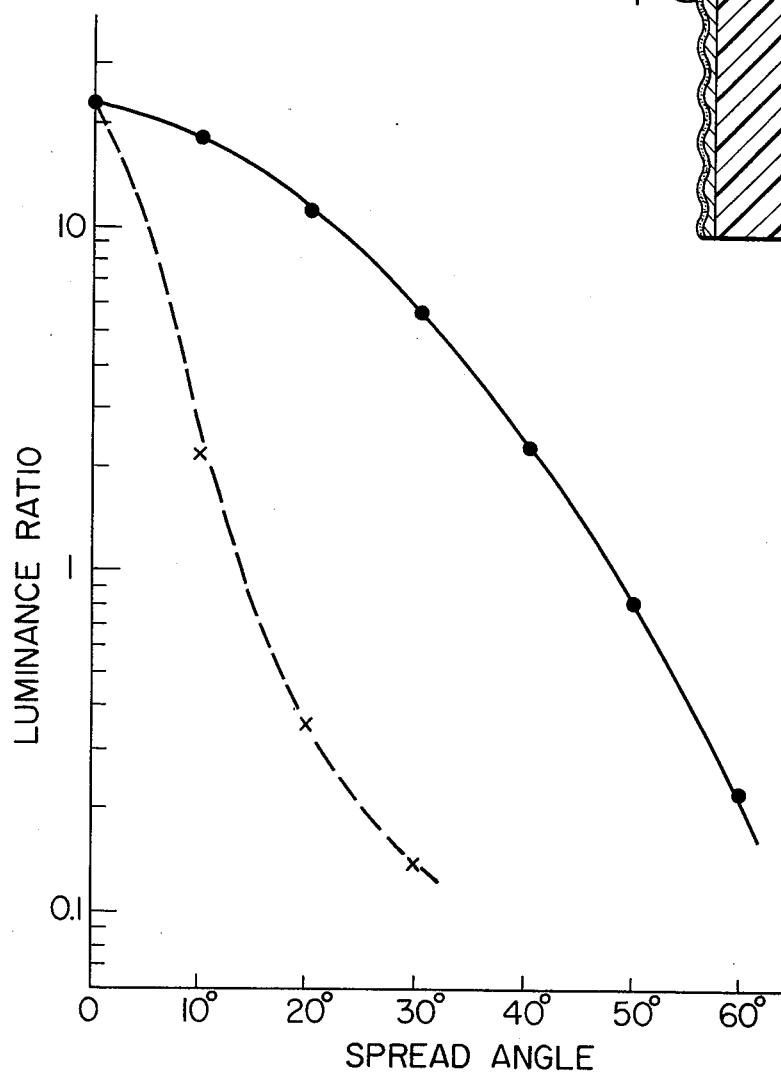
FIG. 4 is a graph showing screen characteristics of a projection screen of FIG. 1.

In FIG. 4 is shown a graph showing screen characteristics of the projection screen of FIG. 1. The abscissa represents a spread angle from a normal line at an incident point and the ordinate represents luminance ratio at each incident point. The luminance ratio at 30° of spread angle in the horizontal direction is about 6 while the luminance ratio at 10° in the vertical direction is about 2.3, and furthermore, the luminance ratio at 0° in the horizontal direction and that at 0° in the vertical direction are both about 23, which is not extremely high. Consequently, projection in broad daylight is possible and there is not any gleam.

EXAMPLE 1

On the surface of an aluminum plate (1mm. thick) moving at a speed of 20m./min. was rotated a Nylon non-woven grinding belt (particle size No. 120 according to JISR 6001) at a circumferential speed of 500m./min. to produce a surface having a pattern of directional irregularities. The surface roughness was 3S when expressed as a maximum height (R max).

The aluminum plate thus mechanically treated was subjected to an alkali etching by soaking the aluminum plate in a 2.5N aqueous sodium hydroxide solution at 30°C for 25min. to form craters at random all over the surface while the directional irregularities were partly retained. The resulting surface roughness was 0.1S–0.4S expressed as a maximum height (R max).

The resulting aluminum plate was subjected to electrolysis in a 2N. aqueous sulfuric acid solution at a current density of 1A/dm$^2$ for 10 minutes to form an oxide film 3 microns thick, followed by washing to obtain an aluminum plate for a projection screen as illustrated in FIG. 2. For comparison there is shown the light-reflecting surface of a commercially available prior art projection screen in FIG. 3.

The relation of luminance ratio and spread angle of the aluminum plate treated in accordance the present invention as above is shown in FIG. 4.

EXAMPLE 2

A laminate plate composed of a high density polyethylene plate (1.8mm. thick) having aluminum foil (100 microns thick) on both surfaces (Planium R No. 2100, trade name, supplied by Mitsui Petrochemical Industries, Ltd.) was moved at a speed of 20m./min., and a sandpaper grinding belt (particle size No. 150) was rotated at a circumferential speed of 50cm./min. to produce a surface having a pattern of directional irregularities. The resulting surface roughness was 3S expressed as a maximum height (R max).

The laminate plate thus mechanically treated was soaked in a 1N. aqueous hydrofluoric acid solution to carry out an acidic etching at 30°C for 5 min. and there was formed a surface on which the directional irregularities pattern partly remained and on which a crater pattern was distributed at random throughout the whole surface. The surface roughness was 0.1S–0.4S expressed as a maximum height. The resulting surface was subjected to electrolysis in a 2N. aqueous phosphoric acid solution for 5 min. at a current density of 1A/dm$^2$ to form an oxide film 2 microns thick and washed with water to produce a laminate plate for projection screen.

The luminance was measured in a similar manner to Example 1 and the result was similar to that shown in FIG. 4.

I claim:
1. A projection screen which comprises:
    a substrate having a metallic aluminum surface,
    a transparent film overlaying said metallic aluminum surface,
    said metallic aluminum surface having a fine, dense pattern of directional irregularities and a pattern of nondirectional craters provided thereon; and
    said transparent film having a thickness of from 0.5 to 10 microns and a roughness expressed as a maximum height (R max) of from 0.2S to 25S.
2. A projection screen according to claim 1 in which the transparent film comprises an aluminum oxide film.
3. A projection screen according to claim 1 in which the transparent film comprises a plastic film.
4. A process for producing a projection screen which comprises the steps of:
    applying a mechanical substantially unidirectional abrasive surface treatment to a metallic aluminum surface of a substrate to form a fine, dense pattern of directional irregularities;
    etching the treated surface thus obtained to form a nondirectional crater pattern thereon; and
    forming a transparent film on the treated, etched surface to protect the surface without substantially decreasing the reflectivity thereof.
5. A process according to claim 4 in which the transparent film is formed by anodizing the treated, etched surface to form an aluminum oxide film.
6. A process according to claim 4 in which the transparent film is formed by applying plastic to the treated, etched surface to form a plastic film.

* * * * *